United States Patent

[11] 3,542,173

[72] Inventors Dietrich Kratzenberg
Haibach;
Walter Heyl, Klein-umstadt; Karl Matzke,
Goldbach; Theodor Abels, Momlingen,
Germany
[21] Appl. No. 708,039
[22] Filed Feb. 26, 1968
[45] Patented Nov. 24, 1970
[73] Assignee Linda Aktiengesellschaft
Wiebaden, Germany
a corporation of Germany
[32] Priorities Feb. 24, 1967
[33] Germany
[31] No. L55832;
Oct. 30, 1967, Belgium, No. PV50202
Nov. 13, 1967, Austria, A 10,203

[54] CONTROLS FOR HYDROSTATIC TRANSMISSION
AND BRAKES
6 Claims, 3 Drawing Figs.

[52] U.S. Cl. .................................................. 192/4,
74/478.5, 74/875, 192/3.5, 192/3, 192/13,
192/.082, 192/.09
[51] Int. Cl. .............................................. F16h 57/10
[50] Field of Search ........................................... 192/4A, 4B,
4R

[56] References Cited
UNITED STATES PATENTS

| | | | |
|---|---|---|---|
| 3,349,860 | 10/1967 | Ross ............................. | 180/6.44 |
| 2,872,000 | 2/1959 | Herndon et al. ................ | 192/4A |
| 3,049,884 | 8/1962 | Schroeder ...................... | 192/4BX |
| 3,331,480 | 7/1967 | Christenson et al. .......... | 192/4B |
| 3,368,426 | 2/1968 | Karig et al. .................... | 192/4AX |

Primary Examiner—Benjamin W. Wyche, III
Attorney—Karl F. Ross

ABSTRACT: A control system for a reversible stepless hydrostatic transmission between an internal combustion engine and a load, e.g. the driven wheels of an automotive vehicle or the like, wherein a pair of pedals are pivotally mounted for movement about a common axis to control the respective output direction of the transmission, whereby one of the pedals swings upwardly from its neutral position when the other pedal is depressed and vice versa, the system having a third pedal swingable about an axis parallel to (and preferably coinciding with) the axis of the first two pedals and provided with abutments engageable with the first two pedals to swing them into coplanarity with each other and with the third pedal in the control position whereby the transmission output is essentially brought to zero, the third pedal also operating a brake or other speed control device.

INVENTORS,
DIETRICH KRATZENBERG,
WALTER HEYL,
KARL MATZKE,
THEODOR ABELS

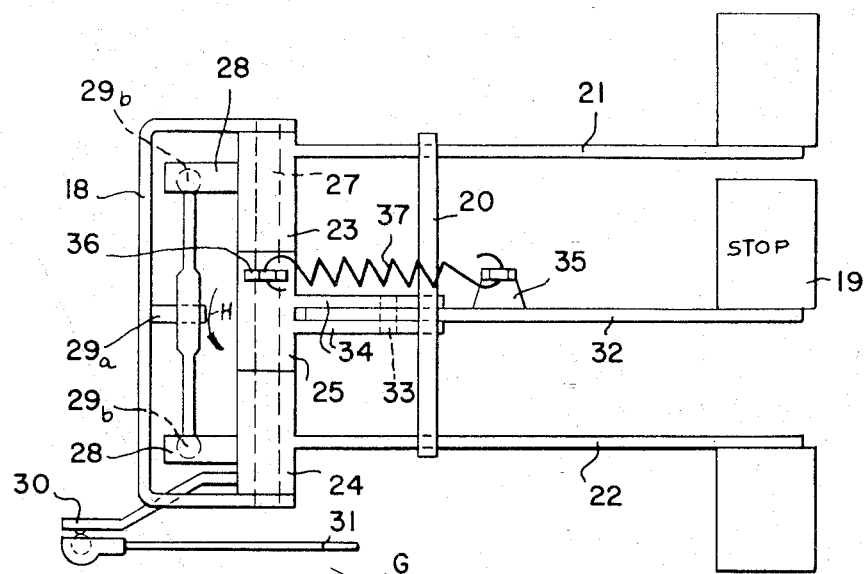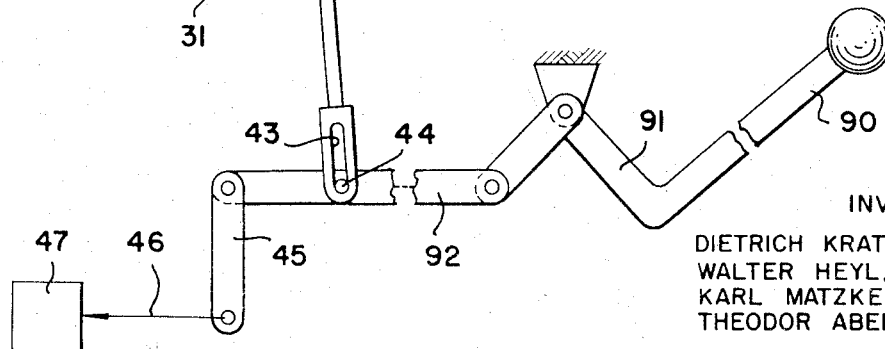

CONTROLS FOR HYDROSTATIC TRANSMISSION AND BRAKES

Our present invention relates to a pedal-type control system for stepless transmission of an automotive vehicle or the like, especially a forklift loader, a front end loader, tractor or hydraulic drive vehicle. It is also applicable to operator control systems using stepless transmission between a prime mover and load.

It has already been proposed to provide control devices for a stepless transmission having a pair of oppositely movable interconnected pedals or other actuating elements which lie in a common plane in the neutral or null position (zero output) of the transmission, each of the actuating devices or pedals controlling the transmission upon its operation in a given direction. Typical transmissions for this purpose include those of U.S. Pat. Nos. 2,975,597, 3,142,963, 3,163,987 and 3,279,173 as well as those of the patents cited in these listed patents. In such transmissions, a swash plate or drive flange can be tilted, e.g. by a hydraulic cylinder, to vary the transmission ratio between the output shaft and the input shaft. In one position of the swash plate or control plate, the output of the transmission is null, and reversal of the tilted plate may cause reversal of the direction of rotation of the output shaft. More complex arrangements frequently use two hydraulic pumps and motors with respective portions adapted to be tilted in opposite directions and respectively effective to regulate the rotation of the output shaft in one or the other sense. When stepless hydrostatic transmissions are referred to, it will be understood that it is transmissions of this type which are principally intended; however, the present invention is applicable to stepless transmissions, reversible drives and the like of any type having an intermediate or null position controllable directly or indirectly by a pair of actuating members or pedals displaceable in opposite senses (see German Pat. No. 1,030,694).

A control system of this character has the advantage that the output shaft of the transmission can be controlled in a highly effective manner substantially exclusively by the control members which are individually depressible from their neutral plane or level to adjust the transmission ratio between the engine and the output shaft in either direction of rotation thereof. The vehicle is braked by reducing the transmission ratio to a relatively low value, i.e. by swinging the actuating member or pedal toward the neutral, null or intermediate position.

It is the principal object of the present invention to provide an improved system of the general character described whose versatility is increased, in which the rate of readjustment of the actuating members to their null positions can be increased without special care on the part of the operator, wherein braking effectiveness can be increased, etc.

Still another object of this invention is to provide a control system of the character described which, in addition, will be capable of operating a brake apart from the transmission.

Still another object of this invention is to provide a control system which is designed for automotive vehicles using an accelerator pedal and a braking pedal, but wherein the dual control system previously described does not confuse the operator.

The above and other objects of this invention, which will become apparent hereinafter, are attained by providing a control device having a third actuating element which cooperates with the first and second actuating elements mentioned earlier and is swingable or otherwise displaceable in the direction of the first and second elements for simultaneously entraining them into their null positions. In general terms, the system of the present invention comprises a stepless transmission which is reversible and has a pair of operating members actuatable to control in a continuous manner that transmission ratio of the transmission, the members being effective upon rotation of the output shaft in opposite directions. The members thus may be hydraulic cylinders which control a hydrostatic speed-changing transmission. The actuating elements of this invention may thus comprise a pair of pedals which are swingably mounted about a common axis and are mechanically coupled so that, upon depression of one of the pedals from its null position (in which the first and second pedals are coplanar) the other pedal rises from its null position; the third actuating element provided in accordance with the present invention can be a third pedal swingably mounted at an axis parallel to the common axis of the first and second pedals (which may control forward and reverse movement of the shaft, respectively) and advantageously along an axis coinciding with the axis of the first and second pedals.

According to a more specific feature of this invention, the third pedal is provided with a pair of abutments engageable respectively with the first and second pedals which, upon depression of the third pedal, bring the first and second pedals back into the null position, thereby decreasing the transmission ratio regardless of the direction of rotation of the shaft and, finally reducing the transmission output to approximately zero. The transmission may be driven by the internal combustion engine of an automotive vehicle, and the output shaft of the transmission may be connected with a load in the form of the driven wheels of the vehicle; in this case, the third pedal may be connected with a decelerating or braking control coupled with the engine, the driven wheels or the drive chain between the transmission and the driven wheels (e.g. a friction brake) to simultaneously assist the braking action of the transmission with another speed-reducing action. Of course, the third pedal may be provided solely to swing the other pedals to their null positions. This system has the advantage that only a single pedal (i.e. the third pedal) need be actuated by the operator of the vehicle in normal vehicle drive procedure to stop the vehicle, in spite of the fact that two pedal controls are provided for the speed change transmission. As has been indicated, the third pedal has a pair of abutments which are engageable with one of the first and second pedals, regardless of which of the latter have been actuated, and swings it until the other abutment engages the other pedal, thereby positioning the first and second pedal in coplanar relationship and in their null positions. Regardless of which the first or the second pedal is controlling the transmission or has been displaced, the operation of the third pedal will shift the first and second pedals into the null positions. Note, however, that the third pedal need not be coplanar with the first and second pedals in their null position since the third pedal shank may be bent upwardly or downwardly as may prove convenient.

Still another feature of this invention resides in the provision of spring means for biasing the third pedal out of engagement with the first and second pedals and preferably out of the path thereof whereby the abutments of the third pedal do not interfere with actuation of the first and second pedals. Only upon displacement of the third pedal does one of its abutments engage a respective one of the other pedals until both abutments simultaneously engage the first and second pedals, i.e. when these pedals reach the same level. Alternatively, the spring means can be provided to draw the abutments of the third pedal constantly against the first and second pedals so that the spring means here is effective to retain the first and second pedals in their null positions. This latter system, whereby the spring means draws the first and second pedals into their null positions when either is released, has the advantage that the third pedal is constantly entrained with one of the other pedals. Also, the third pedal has no fixed position in the latter case. Furthermore, the spring force must always be overcome by the operator upon actuation of the first and second pedals.

According to another aspect of this invention, the third actuating element or pedal is coupled with another portion of the drive chain to influence its efficiency concurrently with displacement of the first and second pedals during their null positions, the coupling serving to render any power transmission from engine to load ineffective. The third pedal can thus be coupled with the engine, e.g. at its rotary speed control (carburetor) whereby the speed of the engine is increased when one of the first and second pedals, preferably the forward drive pedal, is depressed to increase the transmission ratio from engine to load. This operation is tantamount to the depression of the gas pedal required when a vehicle is shifted into gear in order to prevent engine stalling. Advantageously, a lost motion or threshold is provided in the coupling between the third pedal and the speed control of the engine such that between the third pedal and the speed control a predetermined play is provided. Thus, the internal combustion engine is maintained at a predetermined minimum rotary speed and is speeded up only after the pedal has been swung through a predetermined minimum stroke and is displaced still further. The play and the minimum rotary speed can be adjusted by a hand-operated lever for setting in accordance with the driving conditions encountered. Thus, the minimum rotary speed may be raised for travel over bad roads with increased resistance or for the speed of power takeoff and the like. In the latter case, higher engine speeds may be required at low road speeds, especially for tractors, for driving via a power takeoff a mowing or threshing implement, a stacking fork or platform or the like in which the power takeoff shaft drives a hydraulic pump.

In a modification of this principle, the third actuating element can be used for bringing the drive chain to standstill, the speed control being then cut off by the third pedal. The engine may be a diesel or other fuel injection engine whose fuel injection nozzle and pump may be cut off when the third pedal is brought into the null position, while in an internal combustion engine using the Otto cycle, ignition is cut off. In accordance with another specific feature of this invention, a friction brake may be provided somewhere along the drive between the engine and the wheels, which brake is connected by a mechanical coupling to the third pedal or to a power assist device multiplying the force delivered to the friction brake.

A highly important feature of the present invention resides in the provision of a mechanism coupling the actuating means for the hydrostatic transmission of the friction brake such that, upon exceeding a predetermined braking effectiveness at the transmission, the friction brake will be brought into play, this feature being in part independent from the features previously described. In accordance with this principle of the present invention, we provide a vehicle transmission control pedal and a friction brake control pedal which are swingable about parallel axes and preferably a common axis, for independent operation of the transmission by displacement of the control pedal and displacement of the transmission control pedal by the friction brake control pedal to initially bring the transmission into a braking condition before the friction brake is applied. Here, too, the transmission control mechanism may include a pair of pedals coupled for counterrotation.

The above and other objects, features and advantages of a modified form of the present invention will become more readily apparent from the following description, reference being made to the accompanying drawing in which:

FIG. 2 is a plan view of the control pedals; and

FIG. 3 is a side elevational view of the pedal arrangement of FIG. 2.

Figure 1:
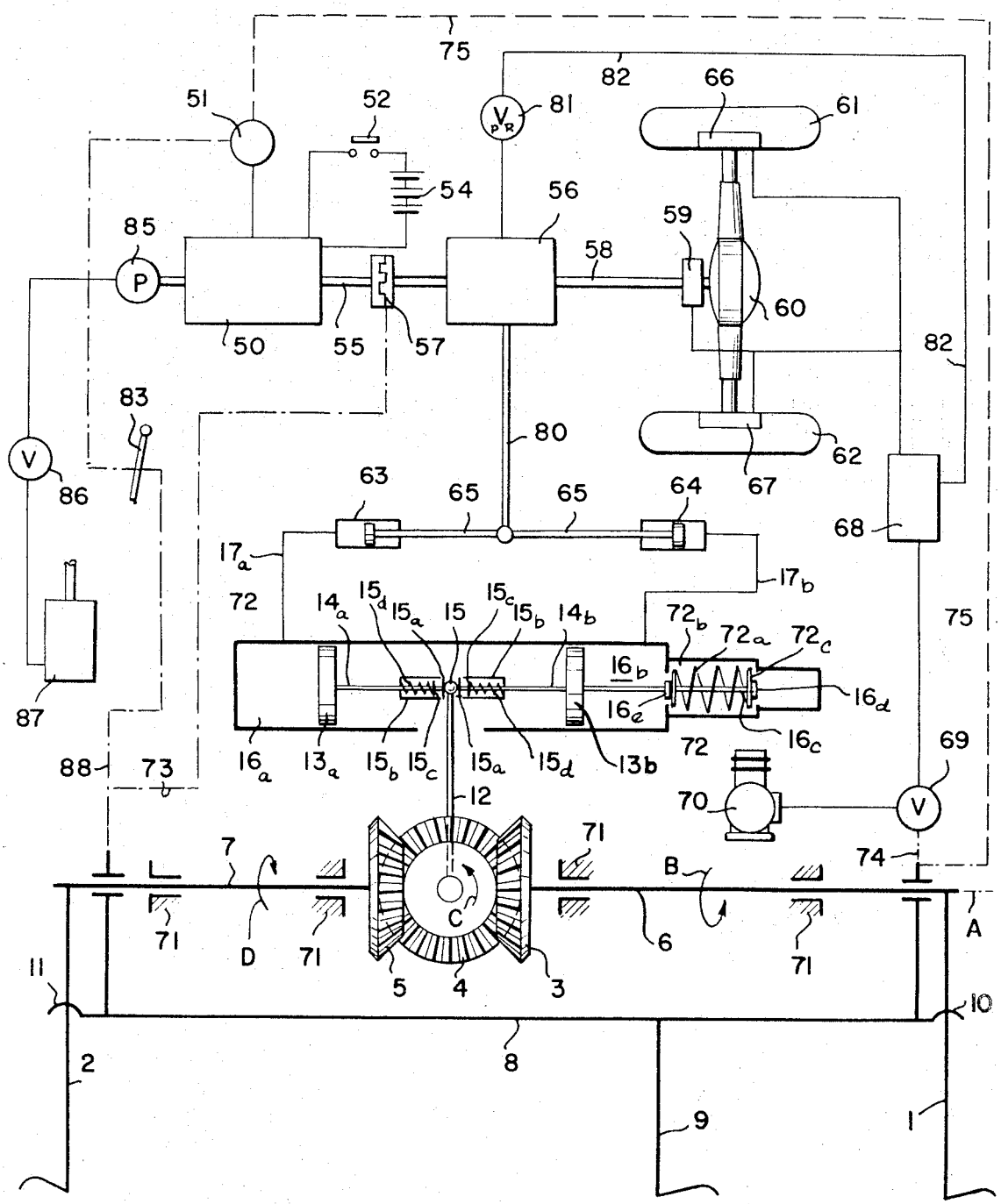
FIG. 1 is a diagram illustrating a control system in accordance with the present invention, the engine and associated parts of the drive chain being shown in block form.

In FIG. 1 of the drawing, we show a control system for an automotive vehicle which comprises an engine 50 whose pedal control or governor is represented at 51 and may be a carburetor. The ignition switch 52 of this engine is connected in circuit with a battery 54 while the crankshaft 55 is connected with a reversible continuous hydrostatic transmission 56 of the type described in any of the aforementioned copending applications. A clutch 57 is interposed between the engine and the transmission while the output shaft 58 of the transmission is provided with a brake 59 before it drives the differential 60 which, in turn, operates the wheels 61 and 62 of the vehicle. The transmission may have one or more control members which are here shown as operated by a pair of pistons 63 and 64 via connecting rods 65. The wheels 61 and 62 are provided with wheel brakes 66 and 67 of the hydraulic type (see Principles of Automotive Vehicles, U.S. Government Printing Office, Washington, D.C., 1956 (page 439). A transmission brake (see pages 425—427 of Principles of Automotive Vehicles) may be provided at 59 as previously indicated. The clutch 57 may be of the type described in pages 264—269 of Principles of Automotive Vehicles. The brakes 59, 66 and 67 are fed with hydraulic fluid from a power assist or air pressure system (see page 450 of Principles of Automotive Vehicles), the air/hydraulic cylinder being represented at 68, while the air valve 69 is mechanically operated by the third pedal 9 and controls flow of air under pressure from the compressor 70 to the air/hydraulic cylinder 68 (see pages 444, 448 and 451 of Principles of Automotive Vehicles).

The control system for the transmission 56 comprises a pair of pedals 1 and 2 (represented diagrammatically in FIG. 1) controlling the forward and reverse rotations of the output shaft of the transmission 56 and varying the transmission ratio as these pedals are depressed. Thus, if the pedal 1 is depressed, the initial displacement of this pedal out of its null position (in which it is coplanar with pedal 2) causes the transmission 56 to drive the shaft 58 in the forward direction and the degree of depression of pedal 1 controls the transmission ratio and thus the velocity of the shaft. Similarly, depression of the pedal 2 places the transmission 56 in reverse rotation with a transmission ratio controlled by the degree of depression of this pedal. To prevent both opposite movements from being applied simultaneously to the transmission, the pedals 1 and 2 are coupled together so that one moves upwardly from its null position when the other is pressed downwardly and controls the transmission. In mechanical terms, the pedals 1 and 2 are respectively provided with shafts 6 and 7 journaled in the vehicle body 71 in the region of the driver's seat and adjacent the accelerator pedal (not shown). Shafts 6 and 7 are coaxial and carry respective bevel gears 3 and 5 which mesh with a common bevel gear 4 journaled at right angles to the axis A of shafts 6 and 7. The bevel gear 4 is provided with a lever 12 whose ball-shaped head 15 is received between a pair of piston rods 14a and 14b to which pistons 13a and 13b in a cylinder 72 are displaceable. Within the cylinder 72, the pistons 13a and 13b define respective working compartments 16a and 16b which are connected via lines 17a and 17b to the hydraulic cylinders 63 and 64 operating the control member of the hydrostatic drive 56. The link 15 is located between a pair of plates 15a which engage a sleeve 15b on each side of the link 15 attached to the respective rod 14a, 14b. A pair of stationary plates 15c form seats for the springs 15d which act upon the sleeves 15b and tend to center member 12. In addition, the pistons 13a and 13b are urged into their null position by a spring 72a which coaxially surrounds the rod 16c and is held captive in a chamber 72b between a pair of abutments 72c. The rod 16c carries a pair of discs 16d and 16e against which the spring 72a bears when the pistons 13a and 13b are displaced to the left and right, respectively.

According to the principles of this invention, the third pedal 9 is mounted upon a frame 8 swingably mounted in the housing for displacement relative thereto and to the shafts 6, 7 about an axis parallel to or coinciding with the axis A. In this embodiment, the pivot axis of the frame 8 coincides with the axis A. A pair of abutments 10 and 11 extend laterally from the frame 8 parallel to the shafts 6, 7, and respectively are engageable with the pedals 1 and 2. When it is desired to drive the vehicle forwardly, pedal 1 may be depressed, thereby rotating shaft 6 in the direction of arrow B and imparting a counterclockwise rotation to the gear 4 (arrow C). The rod 12 is shifted to the left to displace piston 13a and 13b in the same direction, thereby forcing fluid into cylinder 63 via line 17a and withdrawing fluid from the cylinder 64. The actuating member of the transmission 56 is thus displaced to the right to rotate the shaft 58 in the forward direction; the greater the extent to which the pedal 1 is depressed, the greater is the transmission ratio and thus the speed applied to the wheels 61 and 62. Since the pedal 9 has not been depressed, the vehicle mechanisms actuated thereby remain ineffective. Concurrently with the movement of pedal 1 in the direction of arrow B, the gear 5, which meshes with gear 4, is driven in the sense of arrow D to elevate the pedal 2. When it is desired to stop the vehicle, the pedal 9 is depressed whereby its abutment 11 entrains the pedal 2 downwardly until the rising pedal 1 is engaged by the abutment 10. Under these conditions, the pedals 1 and 2 are coplanar and are in their null positions. The gear 4 is rotated in the clockwise sense, thereby restoring the positions of the pistons 13a and 13b to their neutral positions as shown in FIG. 1; the transmission 56 is correspondingly returned to its null position.

When the pedal 9 is depressed, the slowing of the vehicle may be promoted by several other mechanisms. Thus the frame 8 is connected with the clutch 57 as represented by the dot-dash line 73 and is effective, upon depression of the pedal 9 to actuate the clutch and decouple the transmission 56 from the engine 50, thereby preventing the latter from driving the transmission and wheels further. The momentum which must be braked is thereby decreased. Simultaneously, the valve 69, which is coupled with the frame 8 by the line 74, is opened to feed air from the compressor 70 to the air/hydraulic cylinder 68 which, in turn, delivers hydraulic fluid to the brakes 66, 67 and 59, thereby braking the vehicle wheels and the drive shaft 58. Simultaneously, a link between the frame 8 and the speed control 51 of the engine, represented by dot-dash line 75, is effective to reduce the engine speed and opens the ignition switch 52. The vehicle is thus brought to standstill. The neutral positions of the system of FIG. 1 may be considered the plane of the paper.

When reversal of vehicle movement is desired, pedal 2 is depressed behind the plane of the paper while pedal 1 swings forwardly therefrom. The bevel gear 54 is rotated in the clockwise sense and rod 12 urges the pistons 13a and 13b to the right, thereby displacing fluid from chamber 16b via line 17b to the cylinder 64 and permitting return of the fluid from the cylinder 63 via the line 17a to the expanding chamber 16a. The actuating member of transmission 56 is thereby displaced to the left and operates in the reverse direction with a transmission ratio determined by the degree of depression of pedal 2. When pedal 9 is depressed, the abutment 10 engages the pedal 1 and shifts it toward the plane of the paper until the abutment 11 engages pedal 2. Again, the displacement of pedal 9 results in operation of the brakes, the clutch, the speed control and the ignition switch.

In FIGS. 2 and 3, we show the support structure and abutment system in greater detail. In this embodiment, the forward and reverse pedals are represented at 21 and 22 and are pivotally mounted via sleeves 23 and 24 upon a common shaft 27 of the frame 18 of the vehicle body. The third pedal 19, which acts to stop the vehicle, is provided with a shank 32, constituting a lever arm fulcrumed at a pin 33 between the arms 34 of a full sleeve 25 which is pivotally mounted upon the shaft 27 between sleeves 23 and 24. An eye 36 of sleeve 25 forms a seat for a tension spring 37 which engages another eye 35 forming a part of the shank 32 and tends to rotate it in the counterclockwise sense (FIG. 3) about the pin 33. Upon its upper side, the arms 34 are provided with a transverse beam 20 which overlies the shanks of the pedals 21 and 22 and is selectively engageable with these pedals upon depression of pedal 19 with either pedal 21 or pedal 22 in the rest position. The sleeves 23 and 24 are provided with outriggers 28 which extend rearwardly of the fulcrumed rod 27 (see FIG. 3) and are interconnected for movement in opposite senses via a link 29. The latter is pivotally mounted on a pin 29a and has ball-shaped heads 29b received in respective sockets of the outrigger plates 28. Link 29 insures that pedal 21 will rise when pedal 22 is depressed and vice versa. The sleeve 24 carries also a lever 30 which may have a link 31 articulated to it for coupling the pedals 21 and 22 with the hydrostatic transmission at its actuating member 80 (FIG. 1). The lever arm or shank 32 of the pedal 19 is a bellcrank lever whose other arm 41 is pivotally connected to a link rod 42. The spring 37 thus acts to swing the lever 32, 41 about the pivot 33 in the counterclockwise sense (arrow E) and simultaneously tends to swing the lever 32, 34 about the pivot 27 in the counterclockwise sense (arrow F). For engagement with abutment 40, the lever 32 is provided with an upstanding fin 39.

At its free end, the rod 42 is provided with a longitudinally extending slot 43 in which a stud 44 of a bellcrank lever 45 is shiftable. The other arm of this bellcrank lever is connected to a bowden cable 46, which, in turn, may be connected with a friction brake 47 as representative of the brakes 66, 67 and 59.

For normal forward drive of the vehicle, whose drive train may be constituted as shown in FIG. 1, pedal 21 is depressed, thereby lifting pedal 22 and with it the pedal 19. The sleeve 23 is swung in the clockwise sense (arrow G), thereby rotating the link 29 in the direction of arrow H and swinging the pedal 22 and its lever 30 in the counterclockwise sense (arrow F). The link member 31 is displaced to the right to shift the hydrostatic transmission into forward drive with a transmission ratio determined by the degree of depression of the "forward" pedal 21. For reverse travel, the pedal 22 is depressed, thereby swinging the lever 30 in the clockwise sense (arrow G) drawing the rod 31 to the left, shifting the transmission 56 into reverse, swinging the link 29 in the opposite sense and raising lever 21. To stop the vehicle, regardless of which of the pedals 21 and 22 is raised, one need only depress the pedal 19, 32, which here rests upon the raised pedal 21 or 22, to entrain it in the clockwise sense (arrow G). Since member 20 is carried by the lever 34, this lever is halted when the rod 20 simultaneously engages both pedals in the control positions of the transmission control levers 21 and 22. However, lever 32 is displaceable independently of lever 34 about the pivot 33 and can be depressed further to bring the friction brake 47 into play after the levers 21 and 22 have been displaced into their null positions by the additional foot pressure required to overcome the force of spring 37. Thus the pivoting of lever 32 relatively to lever 34 swings lever 41 and, via the traction rod 42 and pin 44, actuates the brake. Brake 47 (66, 67 and 59) is actuated to bring the vehicle to standstill. A spring may be provided to swing the assembly 19, 32, 34 upwardly about pivot 27 (FIG. 3); otherwise the assembly 19, 32, 34 rests via member 20 upon one or both of the pedal levers 21, 22 as shown.

The pivot point coupling the rod 42 with the lever 41 lies substantially along the imaginary line connecting the axis of rod 27 with the axis of stud 44 so that the normal swinging movement of the pedal 19, 32, 34 about the rod 27 has practically no influence of the upon the position of the bellcrank lever 45. When an influence of the pedal 19 upon the position of the lever 45 must be cut out completely, it is necessary to provide the pivot at the free end of lever 41 coincidentally with the axis of bolt 27; between lever 41 and rod 42, therefore, an additional bellcrank lever is necessary.

When the apparatus described generally above is used in a vehicle in which the friction brake is to be activated only after the hydrostatic drive is brought into its null position, the system of FIG. 3 may be used since spring 37 is not overcome until the bar 20 has brought both pedals 21 and 22 into their null positions. During such action or thereafter, the limiting force of spring 37 can be overcome by foot pressure on the pedal 19. In FIG. 1, for example, a pressure relief valve 81, which does not materially detract from the transmission braking, is illustrated and is connected to the air/hydraulic cylinder (line 82) to activate the brakes automatically only after the vehicle has been slowed by transmission braking, the clutch 57 being disconnected from the frame 8 in this case. Under these circumstances, the brakes may be applied automatically to prevent rolling of the vehicle upon steep hills when transmission braking is used to slow the vehicle. Thus, when heavy braking of the transmission is effected by the vehicle nevertheless tends to race ahead, a high pressure develops in the transmission and is relieved via the valve 81, the relieved pressure controlling valve 68 to apply the friction brakes.

When the apparatus of FIGS. 1—3 is used in a forklift truck, front end loader or the like, we provide a lever 83 which controls a power takeoff 94 from the engine which may drive a hydraulic pump 85 to supply fluid to the control valve 86 of the lifting cylinders and motors represented at 87. The lever 83 is coupled with the speed control of the engine to augment the engine speed before the lifting mechanism 83, 85, 87 is pressed in operation and the pedal 9 has been depressed to allow the lift to be operated, the frame 8 being coupled with the lever 83 for this purpose via a connection 88. A lever 90 is provided for manual operation of brake 47 via a lever 91 and a link 92. The slot 43 forms means allowing manual operation of the brake without effect upon the third pedal 32 and its link 42.

We claim:

1. A control device for a reversible stepless transmission of a drive train, an automotive vehicle having a brake, comprising a pair of actuating elements operatively coupled for movement in opposite senses about a common axis and connected with said drive train for controlling same in the respective opposite senses of the drive train, said actuating elements being displaceable from a predetermined null position in opposite senses, a third actuating element displaceable about an axis generally parallel to said axis of the first and second actuating elements and having a pair of abutments respectively engageable therewith upon movement of said third actuating element to entrain one of the first and second actuating elements in the direction of said null position until both said abutments engage said first and second actuating elements; said first, second and third actuating elements being first, second and third pedals respectively displaceable about said common axis and said first and second pedals being substantially coplanar in their null position; and means operatively coupling said brake with said third pedal.

2. A control device as defined in claim 1 wherein said brake is a friction brake and is actuated by said third pedal only upon application of a pressure thereto exceeding a predetermined limiting force.

3. A control device as defined in claim 2 wherein said third pedal comprises a first lever portion and a second lever portion articulated together and jointly swingable about a fulcrum of said first lever portion coinciding with the axis of said first and second pedals, and spring means biasing said first and second lever portions with said limiting force, said first lever portion being provided with said abutments, said second lever portion being coupled with said brake whereby said brake is unaffected by displacement of said first lever portion about its fulcrum.

4. A control device as defined in claim 1 wherein said brake includes a manually operable brake lever and means between said brake lever, said brake and said third pedal for permitting manual operation of said brake without effect upon said third lever.

5. In an automotive vehicle having a transmission coupling an engine with the vehicle wheels and a friction brake effective to brake rotation of the wheels, a control system comprising transmission control means operatively connected with said transmission and displaceable between a first position in which said transmission and said engine form a brake limiting the speed of said vehicle when said transmission causes said engine to rotate, and a second position in which said vehicle is operable with reduced braking effect of said transmission; a friction brake control member displaceable for actuating said friction brake; means coupling said member with said transmission control means for shifting said transmission control means from one of said positions toward the other of said positions upon displacement of said member prior to operation of said friction brake thereby, and transmission control means including a first pedal lever swingable about an axis, said member being another lever swingable about said axis and said means coupling said member and said transmission control means being an abutment formed on said other lever and engageable with said first lever.

6. A control device for a reversible stepless transmission of a drive train of an automotive vehicle having a brake, comprising a pair of actuating elements operatively coupled for movement in opposite senses about respective pivot axes and connected with said drive train for controlling same in the respective opposite senses of the drive train, said actuating elements being displaceable from a predetermined null position in opposite senses, a third actuating element displaceable about an axis generally parallel to said axis of the first and second actuating elements and having a pair of abutments respectively engageable therewith upon movement of said third actuating element to entrain one of the first and second actuating elements in the direction of said null position until both said abutments engage said first and second actuating elements; said first, second and third actuating elements being first, second and third pedals respectively displaceable about the respective axes and said first and second pedals being substantially coplanar in their null position; and means operatively coupling said brake with said third pedal.

UNITED STATES PATENT OFFICE
CERTIFICATE OF CORRECTION

Patent No. 3,542,173          Dated 24 November 1970

Inventor(s) Dietrich KRATZENBERG et al

It is certified that error appears in the above-identified patent and that said Letters Patent are hereby corrected as shown below:

In the heading, line [73], for the assignee's name "Linda" read -- Linde -- ;

for assignee's address "Wiebaden" read -- Wiesbaden -- ;

Signed and sealed this 8th day of October 1974.

(SEAL)
Attest:

McCOY M. GIBSON JR.
Attesting Officer

C. MARSHALL DANN
Commissioner of Patents